United States Patent
Wu et al.

(10) Patent No.: US 7,479,781 B2
(45) Date of Patent: Jan. 20, 2009

(54) SYSTEM AND METHOD FOR TESTING A LINK CONTROL CARD

(75) Inventors: Kang Wu, Shenzhen (CN); Wei Zhang, Shenzhen (CN); Jun Huang, Shenzhen (CN); Li Ding, Shenzhen (CN)

(73) Assignees: Hong Fu Jin Precision Industry (Shenzhen) Co., Ltd., Bao-an District, Shenzhen, Guangdong Province (CN); Hon Hai Precision Industry Co., Ltd., Tu-Cheng, Taipei Hsien (TW)

(*) Notice: Subject to any disclaimer, the term of this patent is extended or adjusted under 35 U.S.C. 154(b) by 237 days.

(21) Appl. No.: 11/440,318

(22) Filed: May 24, 2006

(65) Prior Publication Data
US 2007/0109002 A1   May 17, 2007

(30) Foreign Application Priority Data
Nov. 17, 2005   (CN) .......................... 2005 1 0101527

(51) Int. Cl.
*G01R 31/00* (2006.01)
(52) U.S. Cl. ................................. 324/158.1; 324/73.1
(58) Field of Classification Search .................. None
See application file for complete search history.

(56) References Cited

U.S. PATENT DOCUMENTS

| | | | | | |
|---|---|---|---|---|---|
| 4,622,647 | A | * | 11/1986 | Sagnard et al. | 702/118 |
| 6,809,505 | B2 | * | 10/2004 | Peeke et al. | 324/66 |
| 7,194,673 | B2 | * | 3/2007 | Tuttle et al. | 714/775 |

* cited by examiner

*Primary Examiner*—Vinh P Nguyen
(74) *Attorney, Agent, or Firm*—Morris Manning Martin LLP; Tim Tingkang Xia, Esq.

(57) ABSTRACT

A system and method for testing a Link Control Card (LCC) of a storage device includes a host, a middle plane (MP), a switch, and a testing device array. The host is connected to the testing device array for sending out command sets and receiving results. The MP is connected between the LCC and the testing device array. The switch determines the LCC to output hard reset signals and the hard reset signals are transferred to the testing device array via the MP. The testing device array includes a plurality of testing devices, and each of the testing devices includes a micro-controller unit (MCU); a connector being connected to the MCU, and coupled to the MP; an address setting unit being connected to the MCU, for setting an unique address of each of the testing devices; and a first interface being connected to the MCU for outputting results.

6 Claims, 4 Drawing Sheets

SYSTEM AND METHOD FOR TESTING A LINK CONTROL CARD

CROSS-REFERENCES TO RELATED APPLICATION

Relevant subject matter is disclosed in the copending U.S. patent application Ser. No. 11/440,315, filed on May 24, 2006 and entitled "TESTING SYSTEM AND TESTING METHOD FOR A LINK CONTROL CARD," with which is assigned to the same assignee as this patent application.

BACKGROUND OF THE INVENTION

1. Field of the Invention

The present invention relates to a system and a method for testing a link control card (LCC), and particularly to a system and a method for testing a hard reset state of the LCC.

2. General Background

With the development of information technology, a magnetic disc array is more and more popularly used for various application systems in enterprises. The magnetic disc array provides an additive enclosure storage device for extending storage capacity of a single host or server, and is connected to the host by a small computer system interface (SCSI) or other interfaces. The magnetic disc array is used in storage area networks (SANs) by means of a fiber channel interface, for sharing storage capacities among a plurality of hosts. The magnetic disc array with fiber channel adopts the fiber channel technology and has a fiber channel interface connected to the magnetic disc array's exterior such as a host, with fiber channel technology in it's interior.

Presently, a conventional fiber channel storage device includes two LCCs, a middle plane (MP), a magnetic disc array having fifteen hard disk drives(HDDs), and two power supplies. In a testing procedure of the fiber channel storage device, a host transmits commands to the magnetic disc array, and adopts an enclosure switch to reset the LCCs, for testing a hard reset state of the LCCs. However, the magnetic disc is expensive, and this can increase the cost of testing. Furthermore, the magnetic disc consumes significant amounts of power, and is prone to reliability problems especially if it sustains external shock or vibration. If the magnetic disc operates unreliably, this may compromise the accuracy of the test.

What is needed is a lower cost system and method for readily testing hard reset state of an LCC of a storage device.

SUMMARY

An exemplary system and method for testing a link control card (LCC) in accordance with a preferred embodiment includes a host, a middle plane (MP), a switch, and a testing device array. The MP includes two terminals, and one of the terminals is connected to the LCC. The testing device array is connected to the other one of the terminals of the MP. The host is connected to the testing device array, for sending out command sets and receiving results. The switch determines which of the LCCs to output hard reset signals and the hard reset signals are transferred to the testing device array via the MP. The testing device array includes a plurality of testing devices, and each of the testing devices includes a micro-controller unit (MCU); a connector being connected to the MCU, and coupled to the MP; an address setting unit being connected to the MCU, for setting an unique address of each of the testing devices; and a first interface being connected to the MCU for outputting results.

Other advantages and novel features will become more apparent from the following detailed description when taken in conjunction with the accompanying drawings, in which:

DETAILED DESCRIPTION OF THE EMBODIMENT

Figure 1:
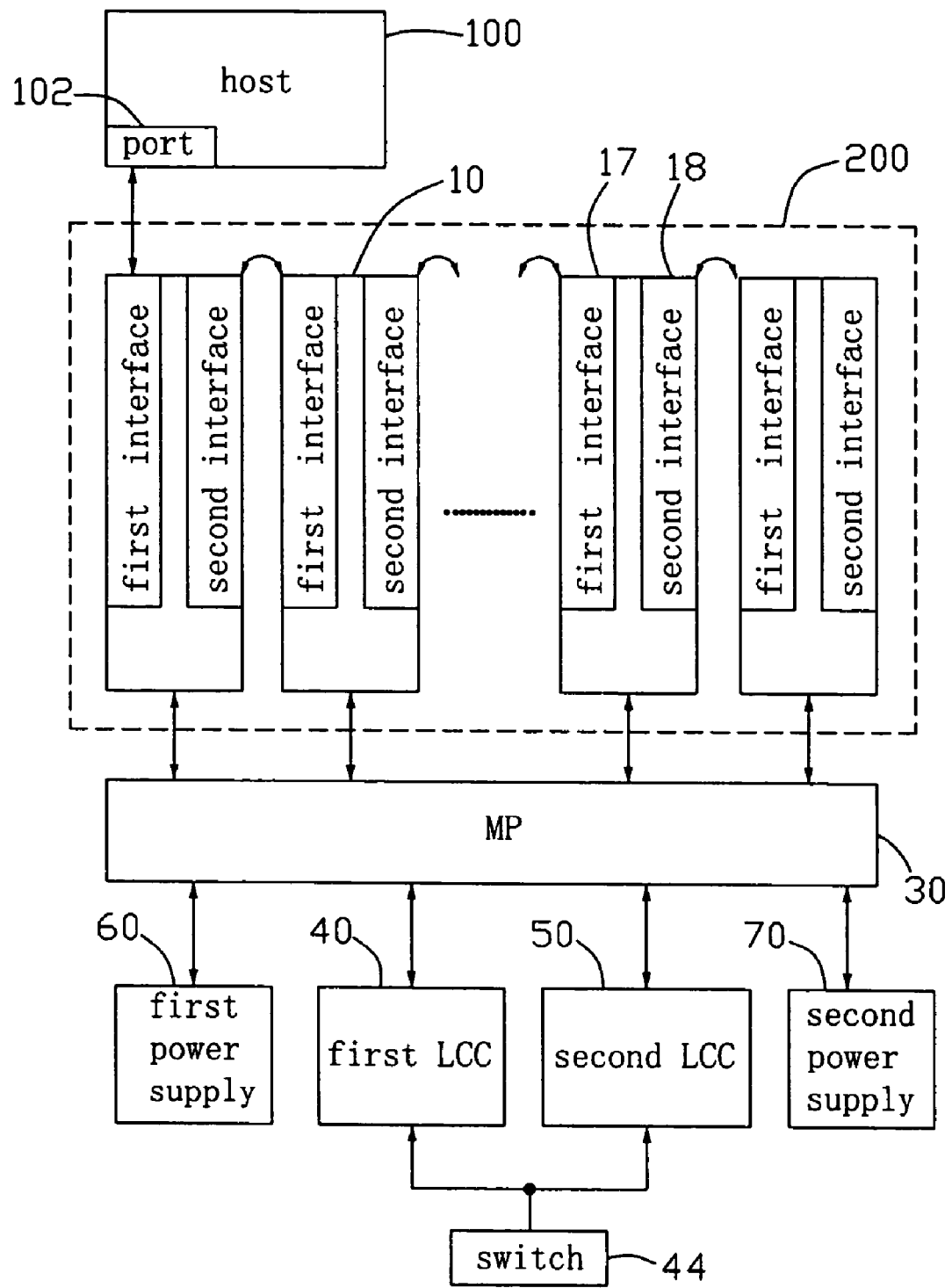
FIG. 1 is a block diagram of a system for testing a link control card (LCC) of a fiber channel storage device in accordance with a preferred embodiment of the present invention; the system includes a testing device array having a plurality of testing devices.

Referring to FIG. 1, a system for testing a link control unit of an electronic device like a link control card (LCC) of a fiber channel storage device in accordance with an embodiment of the present invention includes a host 100, the host 100 has a means to display data such as a liquid crystal display (LCD), a testing device array 200 with fifteen testing devices 10 connected in series, a middle plane (MP) 30, a first LCC 40, a second LCC 50, a first power supply 60, a second power supply 70, and a switch 44.

The testing device array 200 is used instead of fifteen hard disk drives conventionally used. Each of the first LCC 40 and the second LCC 50 has fifteen transmission paths to be tested. Each transmission path is respectively tested by a corresponding one of the testing devices 10. The MP 30 has two terminals, and one of the terminals is connected to the first LCC 40 and the second LCC 50, and the other one of the terminals is connected to the testing device array 200, for distributing energy such as work voltages to each of the testing devices 10 of the testing device array 200. The host 100 is connected to the testing device array 200 via a serial port 102 for sending out command sets and receiving results. The switch 44 is an enclosure switch in a fiber channel storage device, and determines which of the first LCC 40 or the second LCC 50 to output reset signals, and the reset signals are transferred to each of the testing devices 10 via the MP 30 for analysis by the respective tests of each testing device 10.

Figure 2:
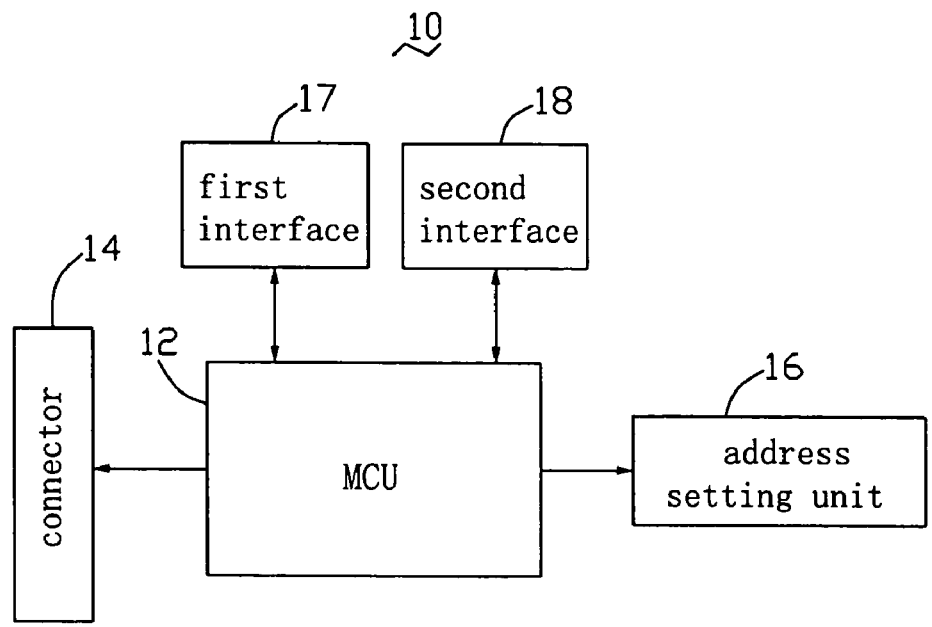
FIG. 2 is a block diagram of each testing device of the testing device array of FIG. 1.

Referring also to FIG. 2, each testing device 10 of the testing device array 200 of the testing system of FIG. 1 includes a micro-controller unit (MCU) 12, a connector 14, an address setting unit 16, a first serial interface 17, and a second serial interface 18. The MCU 12 is a Model PIC18F6520. The connector 14 is connected to the MCU 12, and meets with magnetic disc interface standard SFF-8045 for fiber channels. Each of the testing devices 10 is separately connected to the other one of the terminals of the MP 30 via respective connectors 14 of the testing devices 10. The address setting unit 16 is connected to the MCU 12. The first serial interface 17 (RS232, for example) is connected to the MCU 12, for outputting results. The second interface 18 (RS232, for example) is connected to the MCU 12, for coupling with an adjacent testing device 10.

The host 100 is connected to a first serial interface 17 of a first testing device 10 via the serial port 102. A second serial interface 18 of the first testing device 10 is connected to a first serial interface 17 of a second testing device 10. A second serial interface 18 of the second testing device 10 is connected to a first serial interface 17 of a third testing device 10, and the rest of the testing devices 10 are connected in series in this way. The host 100 may also be selectively connected to the first serial interface 17 of the second testing device 10 via the serial port 102, or the first serial interface 17 of any of the rest of testing devices 10.

Figure 3:
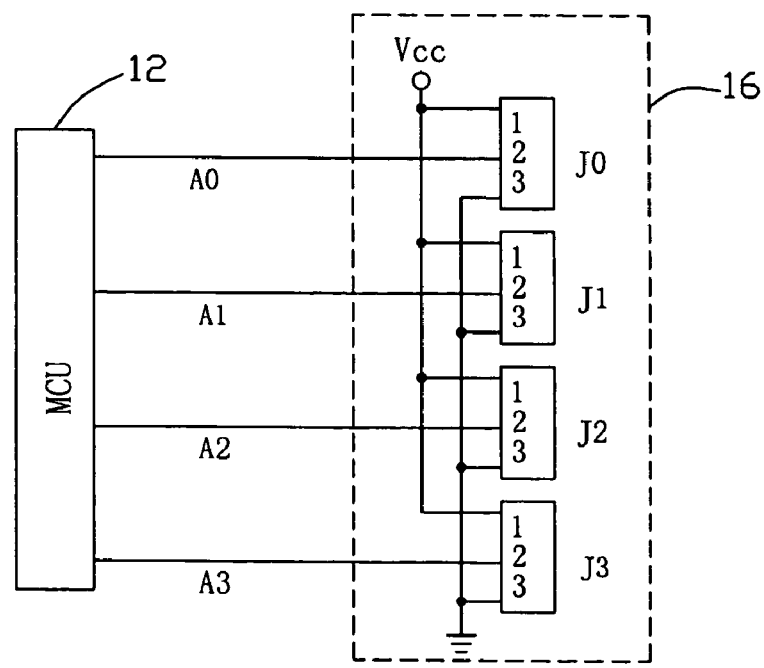
FIG. 3 is a circuit diagram of an address setting unit of each testing device of FIG. 1.

Referring also to FIG. 3, it shows a circuit diagram of the address setting unit 16 of each testing device 10 of FIG. 1. The address setting unit 16 of each testing device 10 includes four bidirectional switches J0, J1, J2, and J3 for setting four-bit addresses A0, A1, A2, and A3. When the switch J0 is set at pin 1, A0 is logic level "1". When the switch J0 is set at pin 3, A0 is logic level "0". Addresses A1, A2, and A3 are set in the same manner as A0. So each switch of each testing device 10 may be set according to the desired address for that testing device 10. The addresses for each of the fifteen testing devices 10 are as follows: "0000", "0001", "0010", "0011", "0100", "0101", "0110", "0111", "1000", "1001", "1010", "1011", "1100", "1101" and "1110".

Figure 4:
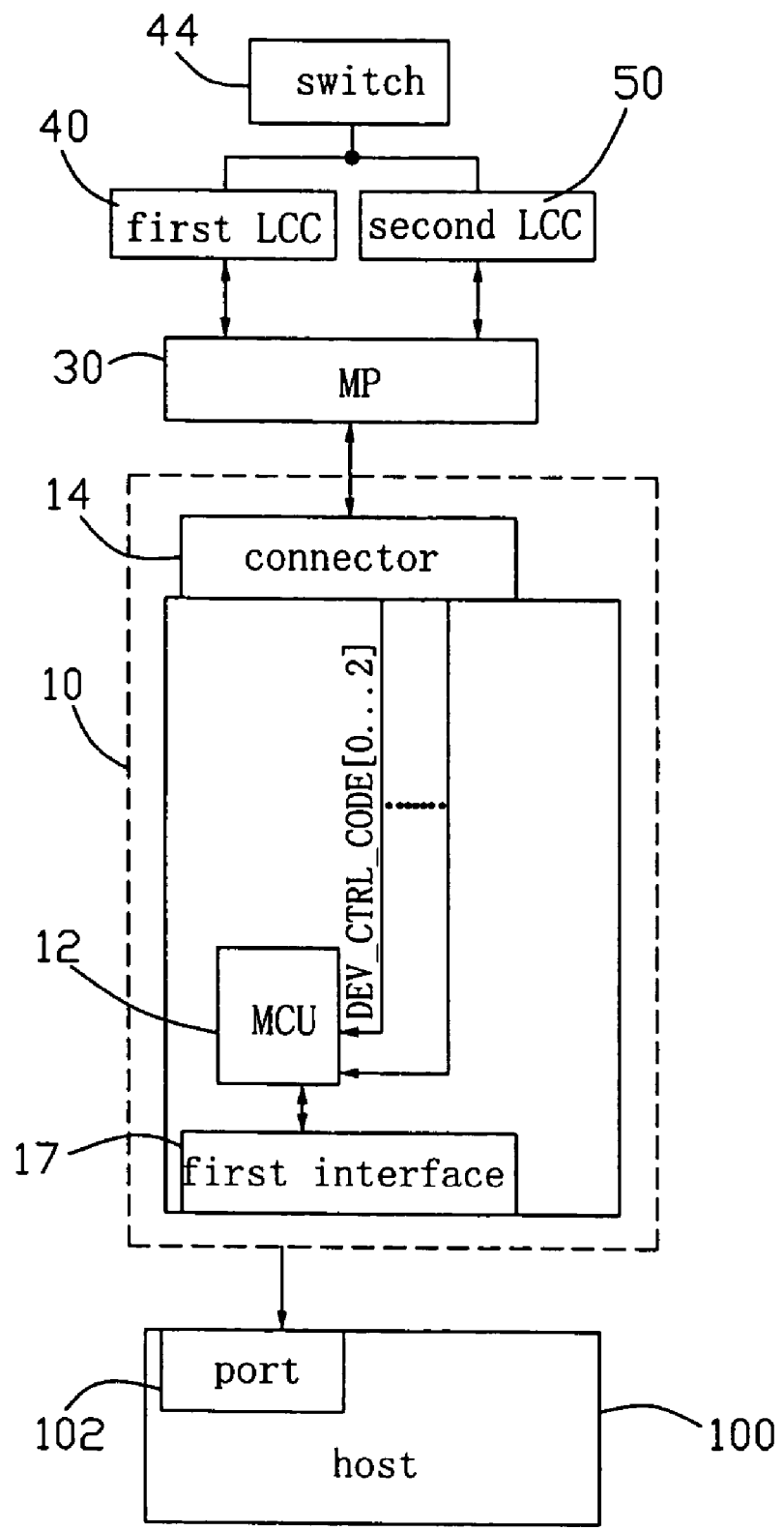
FIG. 4 is a block diagram including a portion of a first testing device of FIG. 1, during hard reset testing.

Referring also to FIG. 4, it shows a hard reset testing including a portion of a first testing device 10 of FIG. 1. In respect to the first testing device 10 as an example, when the switch 44 is turned on manually, a selected one of the first LCC 40 or the second LCC 50 will output hard reset signals DEV_CTRL_CODE [0 . . . 2] which are commands that perform hard reset of the first LCC 40 or the second LCC 50, and the hard reset signals are transferred to the MCU 12 of the first testing device 10 via the MP 30 and it's connector 14, subsequently, the MCU 12 monitors hard reset time data of the first LCC 40 or the second LCC 50. The hard reset time data is a sequence of pulse durations of the hard reset signals. When another testing device 10 tests the first LCC 40 or the second LCC 50, the principle is the same as the first testing device 10.

Figure 5:
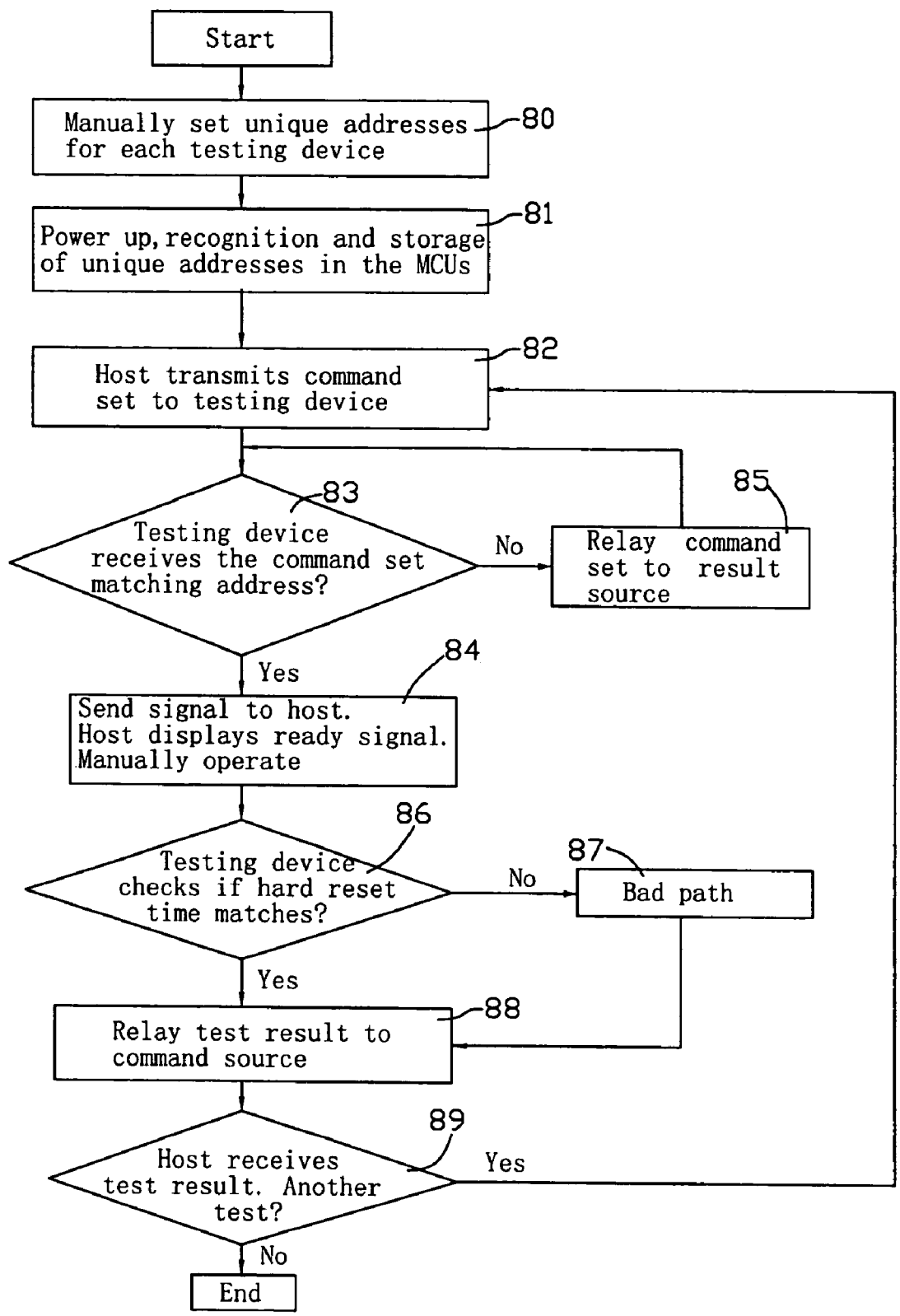
FIG. 5 is a flow chart of a method for testing the system of FIG. 1.

Referring to FIG. 5, a method for testing the system of FIG. 1 is shown. In the preferred embodiment, the host 100 is connected to the first testing device 10. Unique address for each of the testing devices 10 is set manually. Then the testing system is powered up. Each MCU 10 of each testing device 10 detects and stores its unique address. The host 100 sends command sets to the first testing device 10 and receives test results and address match signals from the first testing device 10. The command sets are sent sequentially, with the first command set containing the unique address of the first testing device 10 and the next command set is issued after receiving test result of the previous command set containing the unique address of the next testing device 10. The process continues in this way until all testing devices 10 have received command sets and returned test results. Each testing device 10 receives command sets and test results. Each testing device 10 receives the command sets from a command source, either the host 100 or another testing device 10. In the preferred embodiment, only the first testing device 10 receives command sets from the host 100, the remaining testing devices 10 receive command sets from another of the testing devices 10. Each testing device 10 receives test results or address match signals from a result source, which is another of the testing devices 10 that is not its command source. When a testing device 10 receives a command set, it checks to see if the command set contains its unique address. If yes, then it passes the address match signal to its command source. When the signal is received by the host 100, a ready signal is indicated on the LCD and an operator then manually activates the switch 44 causing generation of hard reset signals in the LCC 40 or LCC 50. Then testing is done and results returned to the command source. If no, the command set is passed on to the result source. When a testing device 10 receives a test result, it passes the result to the command source.

Step 80: manually set a unique address for each of the testing devices 10 of the testing device array 200. Each of the testing devices 10 receives a unique address through the setting address unit 16 thereof. An address of the first testing device 10 is "0000", an address of the second testing device 10 is "0001", and an address of the third testing device 10 is "0010", and so on. The address of each of the testing devices 10 is as follows in Table 1.

TABLE 1

| | | address of each of the testing devices | | | |
|---|---|---|---|---|---|
| number | address | number | Address | Number | address |
| first testing device | 0000 | second testing device | 0001 | third testing device | 0010 |
| forth testing device | 0011 | fifth testing device | 0100 | sixth testing device | 0101 |
| seventh testing device | 0110 | eighth testing device | 0111 | ninth testing device | 1000 |
| tenth testing device | 1001 | eleventh testing device | 1010 | twelfth testing device | 1011 |
| thirteenth testing device | 1100 | fourteenth testing device | 1101 | fifteenth testing device | 1110 |

Step 81: at the instant of power on, the testing device array 200 senses the addresses of Step 80, and stores the unique address into the MCU 12 of each of the testing devices 10. The address "0000" is stored in the MCU 12 of the first testing device 10, the address "0001" is stored in the MCU 12 of the second testing device 10, and the address "0001" is stored in the MCU 12 of the third testing device 10, and so on, for the remaining corresponding addresses of the rest of the testing devices 10.

Step 82: the host 100 transmits a command set to one of the first testing devices 10 of the testing device array 200 via the serial port 102. It is to be noted there will be a command set for each testing device 10. The command set includes hard reset time parameters of the first LCC 40 or the second LCC 50 according to which is selected for testing at that time, and one of the addresses of the test devices 10. The hard reset time parameters is a predetermined sequence of pulse durations of hard resetting of the first LCC 40 or the second LCC 50. The first command will contain the first address "0000", the second command will contain the second address "0001", and so on to the 15th address of the 15th testing device 10.

Step 83: the first testing device 10 checks if the address of the command set and the stored address of the first testing device 10 are a match. If no, then step 85 is next. If yes, Step 84 is next.

Step 85: the first testing device 10 relays the command set to the second testing device 10 (it's result source). Then, Step 83 is next, and the second testing device 10 will continuing checking the address of the command set with the address of the result source until each of the testing devices 10 match it's stored address and the address of the command set.

Step 84: when there is an address match, the first testing device 10 relays an address match signal to the host 100 (its command source). When the host 100 receives the address match signal, it indicates a ready signal on the LCD to activate switch 44. The operator turns on the switch 44 to control the selected first LCC 40 or the second LCC 50, so as to generate hard reset signals to the first testing device 10 via the MP 30.

Step 86: the MCU 10 of the testing device 10 detects hard reset data of the selected one of the first LCC 40 or the second LCC 50, and compares the hard reset data with the hard reset parameters of the command set. If matched Step 88 is next. If not matched, Step 87 is next.

Step 87: the MCU 12 of the first testing device 10 determines a first path of the selected first LCC 40 or the second LCC 50 being tested is bad. The first testing device 10 tests the first path, the next testing device tests the next path, and so on. Then Step 88 is next.

Step 88: the MCU 12 of the first testing device 10 determines a first path of the selected first LCC 40 or the second LCC 50 being tested is okay, the first testing device 10 relay a first result to the host 100.

Step 89: the host 100 receives the first result. If no more tests, then end here. If more tests, then Step 82 is next, repeating the process until all of the testing devices 10 have received a command set, sent an address match signal to the host 100, and returned a result.

If the first testing device 10 finishes testing and gets the first result, the first result is transmitted to the host 100 directly. If another testing device 10 finishes testing and gets a second result, the second result is transmitted to its command source, and thus the second test result is relayed back to the host 100. For example, when the third testing device 10 tests the first LCC 40, a third result will be transmitted to the second testing device 10, then transmitted to the first testing device 10, and then finally transmitted to the host 100. Address match signals of each of the testing devices 10 are also relayed back to the host 100 in this way. If any of results of the fifteen testing devices 10 is wrong, then the currently tested the first LCC 40 or the second LCC 50 is bad.

The testing system and testing method for the first LCC 40 or the second LCC 50 of the present embodiment do not need to use hard disk drives (HDDs). Only the testing devices 10 are needed to complete testing of the first LCC 40 or the second LCC 50. Thus, the present embodiment provides a simple and low-cost system and method for testing LCCs.

It is believed that the present embodiment and it's advantages will be understood from the foregoing description, and it will be apparent that various changes may be made thereto without departing from the spirit and scope of the embodiment or sacrificing all of its material advantages, the example hereinbefore described merely being preferred or exemplary embodiment.

We claim:

1. A method for testing linking states of an electronic device, comprising the steps of:

electrically connecting at least two testing devices to a link control unit of an electronic device respectively for signal communication;

electrically interconnecting said at least two testing devices so that each of said at least two testing devices is signal-communicable with another of said at least two testing devices;

assigning an identifiable address exclusively to said each of said at least two testing devices;

activating said link control unit of said electronic device; and selectively retrieving output signals resulting from said activating of said link control unit via said each of said at least two testing devices by means of issue of a command set transmissible to said each of said at least two testing devices and containing a corresponding address matching with said identifiable address.

2. The method as claimed in claim 1, wherein said each of said at least two testing devices is used to transmit said command set to said another of said at least two testing devices and to forward said output signals from said another of said at least two testing devices when said corresponding address does not match with said identifiable address.

3. The method as claimed in claim 1, wherein the command set further comprises hard reset time parameters of the link control unit.

4. The method as claimed in claim 3, wherein when the address of the command set matches with the identifiable address of one of said at least two testing devices, an address match signal is generated by the testing device to show it is ready, then a switch is manually operated to output hard reset signals to the link control unit, and the testing device detects hard reset data of the link control unit, compares the hard reset data with the hard reset time parameters, and returning a result.

5. The method as claimed in claim 4, wherein when the hard reset data of the link control unit and the hard reset time parameters are a match, the testing device determines a path of the link control unit being tested is okay.

6. The method as claimed in claim 4, wherein when the hard reset data of the link control unit and the hard reset time parameters are not a match, the testing device determines a path of the link control unit being tested is bad.

* * * * *